June 16, 1953   J. C. SETTLES ET AL   2,642,008
RAILWAY TRUCK SHOCK ABSORBER MOUNTING
Filed Feb. 13, 1948   3 Sheets-Sheet 1
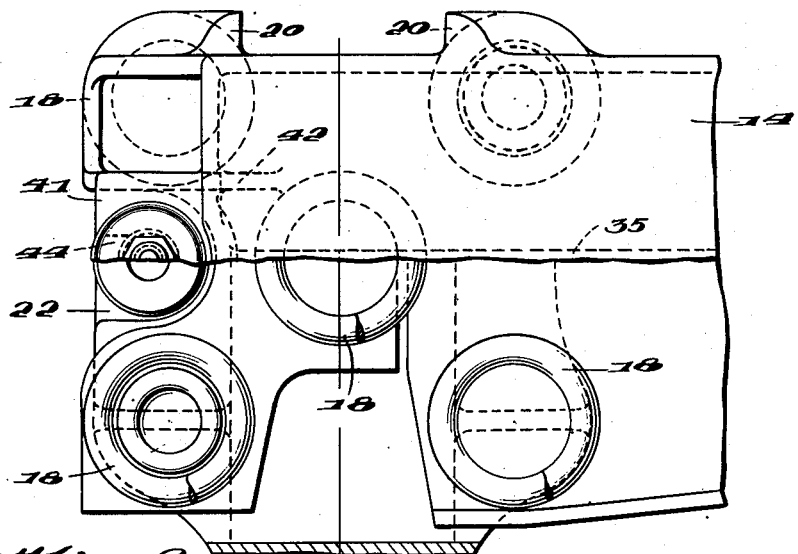
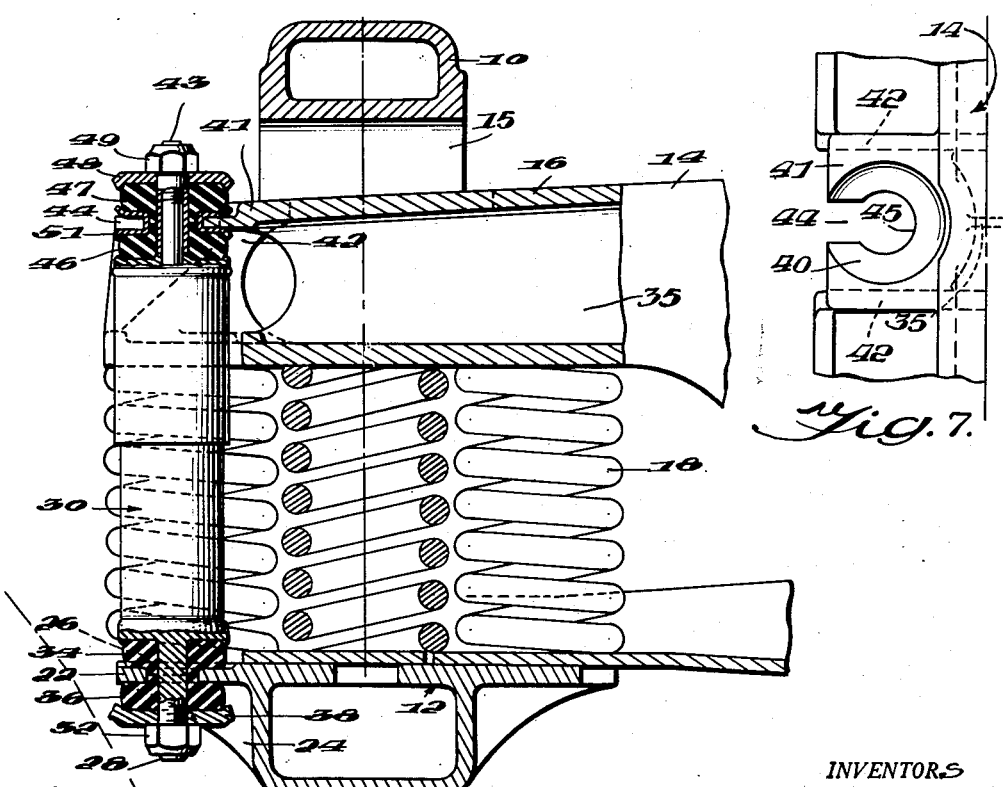
A.A.R. CLEARANCE DIAGRAM
INVENTORS
JAMES C. SETTLES,
L. ELWYN FURNISS,
BY
Robert E. Barry

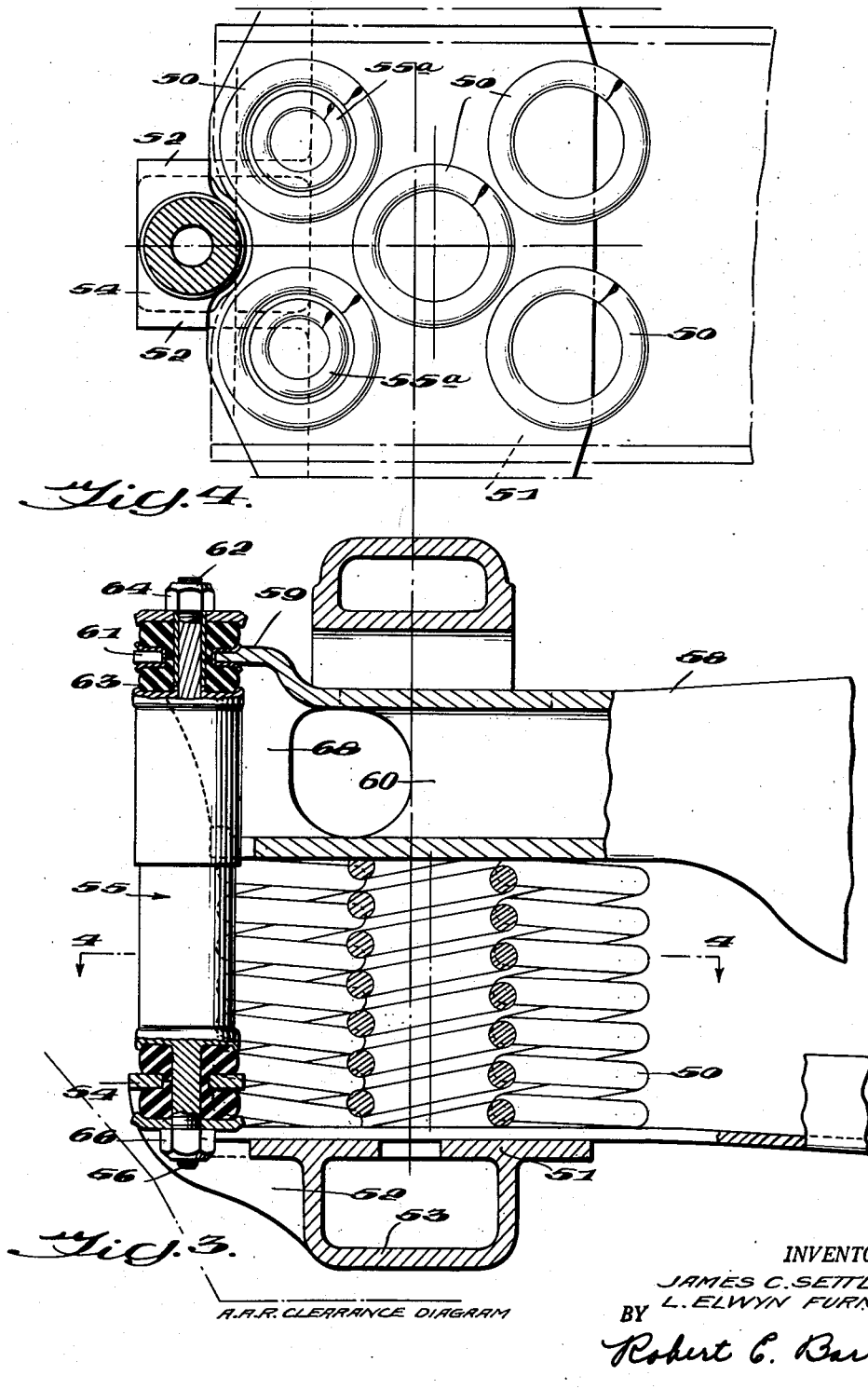

June 16, 1953  J. C. SETTLES ET AL  2,642,008
RAILWAY TRUCK SHOCK ABSORBER MOUNTING
Filed Feb. 13, 1948  3 Sheets-Sheet 3
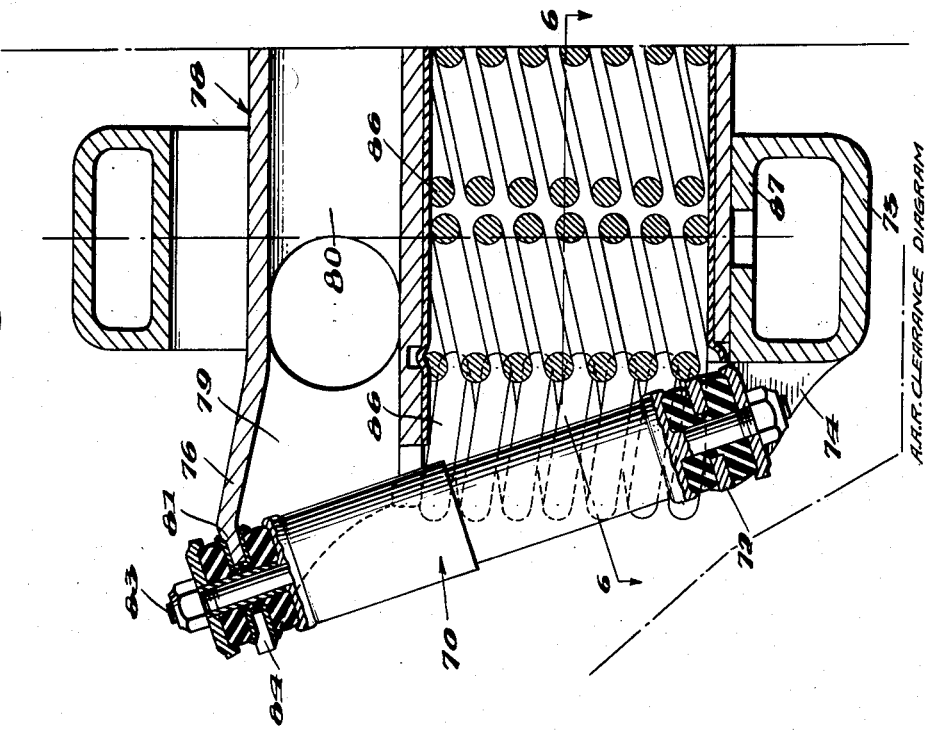
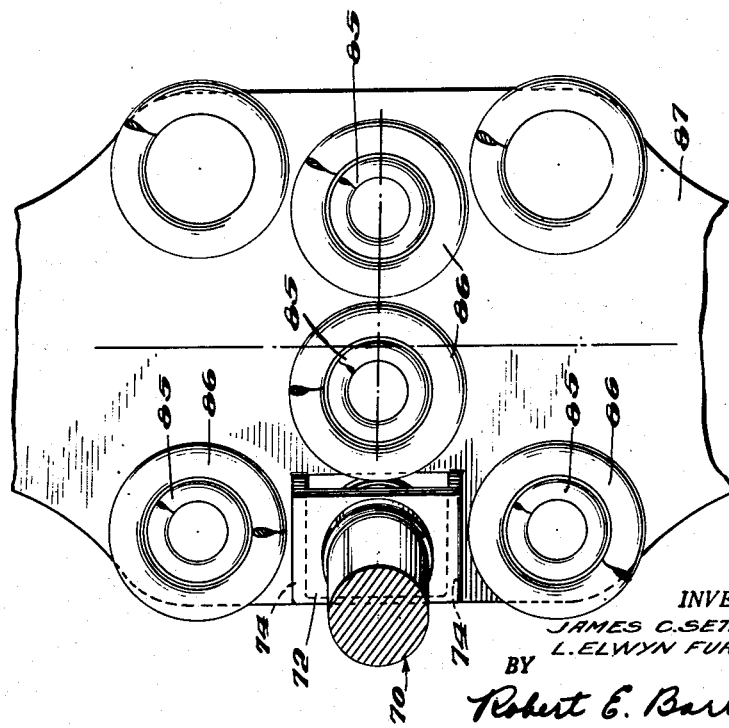
INVENTORS
JAMES C. SETTLES,
L. ELWYN FURNISS,
BY
Robert E. Barry Patented June 16, 1953

2,642,008

UNITED STATES PATENT OFFICE 2,642,008

RAILWAY TRUCK SHOCK ABSORBER MOUNTING

James C. Settles and Loree Elwyn Furniss, Columbus, Ohio, assignors to The Buckeye Steel Castings Company, Columbus, Ohio Application February 13, 1948, Serial No. 8,024

9 Claims. (Cl. 105—197)

The present invention relates to railway car trucks and to damping means for the bolsters of such trucks and more particularly pertains to the structural features of the side frames and the bolster for the mounting of a hydraulic shock absorber to damp oscillations of the bolster.

An object of the invention is to provide a mounting for a hydraulic shock absorber to facilitate assembly of such a damping device on the side frame of a railway truck and for convenient attachment to the end portion of the bolster and at the same time provide a shock absorber assembly which will not project beyond the clearance outline as defined by the American Association of Railroads.

A further object of the invention is to provide a bracket on the side frame of a railway car truck having sufficient strength to withstand the forces developed in damping oscillations of the bolster without materially increasing the manufacturing costs of the side frame and to provide an end portion for the bolster which will facilitate the attachment of the hydraulic shock absorber thereto and permit convenient dismantling of the damping mechanism.

A still further object of the invention is to provide a mounting for a hydraulic shock absorber on a railway car truck so that the shock absorbing device will be effective in damping relative lateral movements between the side frame and the bolster by an inclined arrangement of the shock absorber which will nevertheless position the shock absorber within the clearance diagram as defined by the American Association of Railroads.

Other objects and features of the invention will be more apparent to those skilled in the art as the present disclosure proceeds and upon consideration of the following detailed description and the accompanying drawings wherein several embodiments of the invention are disclosed.

In the drawings:

Fig. 1 is a sectional view taken through the medial portion of a side frame illustrating one mounting of a shock absorber.

Fig. 2 is a plan view of the bolster with parts broken away to illustrate one arrangement of the bolster supporting springs.

Fig. 3 is a view similar to Fig. 1 showing a modified mounting of a hydraulic shock absorber on the side frame and bolster.

Fig. 4 is a diagrammatic plan view showing another arrangement of the load supporting springs taken generally on the line 4—4 of Fig. 3.

Fig. 5 is a sectional view of a medial portion of the side frame and a bolster showing another mounting of the shock absorber.

Fig. 6 is a diagrammatic plan view taken generally on the line 6—6 of Fig. 5.

Fig. 7 is a fragmentary plan view of an end portion of the bolster shown in Figs. 1 and 2 with the shock absorber removed.

The present invention is directed to structural arrangements of the side frame and the bolster for the attachment of a shock absorber of the liquid type to the side frame and the bolster for damping oscillations of the bolster. The side frame requires only minor alterations to provide for the attachment of the lower end of a hydraulic shock absorber to the side frame and at the same time maintain the shock absorber in a position avoiding violation of the American Association of Railroads clearance diagram. The structural arrangement of the end portion of the bolster also requires but minor changes from that of the conventional bolster and is so constructed as to facilitate the attachment of the upper end of the shock absorber to the bolster. A further feature of the invention pertains to the mounting of the upper end of the shock absorber in such a position that the damping device will be more effective in suppressing relative lateral movements between the side frame and the bolster without positioning the shock absorber outwardly beyond the clearance diagram as defined by the American Associations of Railroads.

Referring to Figs. 1 and 2, a side frame is shown which includes a compression member 10 and a tension member 11. The side frame is of the truss-type adapted for a four wheel railway car truck. The side frame includes guide columns connecting the tension and compression members. One of the guide columns is shown at 15 in Fig. 1. The side frame is provided with a spring seat indicated generally at 12. The bolster is shown at 14 which extends through an opening in the side frame and is supported by a plurality of helical springs 18. The bolster is provided with a top wall 16 and with conventional lugs 20 for restraining lengthwise movement of the bolster relative to the side frame. The lower ends of the springs 18 are supported on the spring seat 12 or a spring plate arrangement as shown in Figs. 1 and 2.

A shock absorber mounting exhibiting the invention includes means for attaching the lower end of the damping device to the tension member 11 of the side frame. The side frame may be provided with a bracket 22 having a substantially horizontal upper surface arranged substantially in the same plane as the spring seat 12. In the embodiment illustrated in Figs. 1 and 2, the bracket or plate 22 is reinforced by means of ribs 24 formed integral with the outboard wall of the box-shaped tension member 11 and extend upwardly therefrom and integrally joining the bracket 22 and forming the ends thereof. The bracket or plate 22 is provided with an opening 26 for receiving a stem 28 carried by the lower end of a hydraulic shock absorber 30. The stem 28 is adapted to extend through the opening 26 and is provided with a threaded portion for receiving a nut 32. A resilient washer 34 is interposed between the lower end of the shock absorber and the plate 22. A similar resilient washer 36 is arranged around the stem 28 below the plate 22. A metal washer 38 is arranged between the nut 32 and the resilient member 36.

An extension is formed on each end of the bolster 14. Such an extension may take the form of a top wall 41 projecting beyond the normal end of the bolster. This top wall 41 may be reinforced by ribs 42 (Fig. 7), one of which is shown at 42 in Figs. 1 and 2. A vertically disposed web 35 is arranged longitudinally of the center of the bolster 14 and joins the top and bottom walls. This web 35 terminates at its outer end adjacent the inner ends of the ribs 42. The top wall or plate 41 is provided with an opening 45 through which a stem 43 carried by the upper end of the hydraulic shock absorber 30 is adapted to extend. The plate 41 and reinforcing ribs 42 may be cast integral with the bolster. The top wall 41 is provided with a slot 44 through which the stem 43 may be laterally moved into the opening in the bolster extension for attaching the upper end of the shock absorber to the bolster and for facilitating the dismantling of the shock absorber. A resilient washer 46 is interposed between the upper end of the shock absorber and the plate 41. A similar resilient washer 47 is arranged around the stem 43 above the plate 41. An annular recess 40 surrounds the opening in the top wall of the bolster extension. A metal washer 48 is arranged over the resilient washer 47 so that when the nut 49 is threaded on the stem 43 the upper end of the shock absorber will be securely attached to the end of the bolster 14. A metal bushing 51 may be arranged in the opening provided in the plate 41.

In the embodiment shown in Figs. 1 and 2, the shock absorber 30 is arranged in a substantially vertical position and between two of the outermost load supporting springs 18. These load supporting springs are nevertheless symmetrically arranged on the spring seat and the shock absorber mounting does not project appreciably beyond the conventional outboard diagram. It will be evident that one hydraulic shock absorber is applied at each end of the bolster and these fluid shock absorbers act to damp relative motion of the bolster on the load supporting springs. The shock absorber may be readily mounted on the side frame and bolster and the slot 44 in the plate 41 provides means whereby the shock absorber may be first attached to the bracket 22 and thereafter be attached to the bolster by moving the stem 43 laterally through the slot 44. Thereafter the nuts 32 and 49 may be tightened to secure the hydraulic shock absorber in place on the car truck.

A modified mounting of the shock absorber is illustrated in Figs. 3 and 4. In this embodiment, the tension member 53 of the side frame is provided with relatively long reinforcing ribs 52 which extend upwardly from the side wall of the box-shaped portion of the tension member and terminate adjacent the ends of a bracket 54. The ribs 52 are integral with the tension member and are also cast integral with the bracket 54. The bracket 54 is thereby positioned above the spring seat 51. This bracket 54 is provided with an opening through which the stem 56 carried by the lower end of the shock absorber 55 is adapted to extend. The stem is attached to the plate member 54 by means of resilient washers similar to the arrangement described in connection with Fig. 1.

The extension carried by the end of the bolster 58 is raised above the plane of the top wall of the bolster and the web 59 is provided with an opening having a slot extending radially therefrom as indicated at 61. The web or top plate 59 of the bolster extension may be reinforced by means of ribs, one of which is shown at 68. A web 60 connects the top and bottom walls of the bolster 58 and this centrally located web terminates at its outer end adjacent the inner ends of the ribs 68. The stem 62 of the shock absorber 55 after having the resilient washer 63 arranged thereon may be moved laterally through the slot 61. The nut 64 may be tightened on the stem 62 to secure the upper end of the shock absorber to the bolster. This end portion of the shock absorber may be fitted with a washer arrangement similar to that shown in Fig. 1.

In the embodiment illustrated in Figs. 3 and 4, the shock absorber is mounted on the truck and the bolster supporting springs 50 are more closely spaced than in the arrangement shown in Figs. 1 and 2. The shock absorber in the modification shown in Figs. 3 and 4 is positioned farther outwardly on the outboard side of the side frame and is as a whole arranged higher in order that the lower end of the shock absorber mounting will be within the clearance diagram as defined by the American Association of Railroads. The shock absorber 55 is, however, maintained at a relatively low position in order to facilitate the assembly of the bolster on the side frame. These considerations in the mounting of the shock absorber and as a result of the fact that the spacing of the two outermost coils 50 are too close to permit the shock absorber to be positioned between them, as in Figs. 1 and 2, the entire spring arrangement has been moved inwardly as shown in Fig. 4. Two inner coils 55a are employed in association with the two outermost coils 50 in this modification in order that the center of gravity of the load carried by the helical springs coincide with the center line of the side frame. The helical springs 50 are, however, symmetrically arranged as shown in Fig. 4.

A further modification is illustrated in Figs. 5 and 6 wherein a hydraulic shock absorber 70 is mounted with the axis thereof inclined with respect to a vertical position. The shock absorber in such an inclined position is more effective in damping relative lateral movements between the side frame and the bolster than when the shock absorber is mounted in the true vertical position. In this embodiment, a bracket 72 is supported on the tension member 73 by means of reinforcing ribs 74. These ribs may be integral with the boxlike tension member and integral with the plate 72. The plate or bracket 72 is arranged in a plane which is inclined with respect to the spring seat 87 but is arranged at right angles to the axis of the shock absorber 70.

An extension 76 is provided on the end of the bolster 78. This extension is longer than those of the previous arrangements and thereby positions the upper end of the shock absorber at a greater distance from the outboard side of the side frame. The top wall of the extension 76 may be reinforced by means of ribs, one of which is shown at 79. A web 80 is arranged longitudinally of the central part of the bolster and terminates at its outer end adjacent the inner ends of the ribs 79. The extension 76 is provided with a plate 81 which is arranged in a plane at right angles to the axis of the shock absorber 70. This plate or end portion 81 is provided with an opening through which the stem 83 of the shock absorber extends. A slot 84 permits the stem 83 to be introduced therethrough into the opening. The lower end of the shock absorber 70 is attached to the bracket 72 in a manner similar to that described in connection with Figs. 1 and 2. A similar assembly is employed for attaching the upper end of the shock absorber 70 to the plate 81.

In the embodiment shown in Figs. 5 and 6, the load supporting springs 86 are unsymmetrically arranged on the spring seat 87 and this arrangement of the springs permits the lower end of the shock absorber 70 to be mounted in such a position that the shock absorber assembly does not violate the clearance diagram as defined by the American Association of Railroads. The upper end of the shock absorber while being positioned outwardly from the true vertical position provides an inclined position for the shock absorber which is effective in damping relative lateral movements between the side frame and bolster.

In the embodiment shown in Figs. 5 and 6, four inner coils 85 may be employed in association with the springs 86 so as to properly position the center of gravity of the load with reference to the side frame. In this embodiment, the lower end of the shock absorber 70 is positioned between the two coils 86 at the outboard side of the side frame. At the same time, only the two coils on the transverse center line of the side frame are moved inwardly from the symmetrical position. The inner coils of the load supporting springs at the inboard side of the side frame have been so positioned that the center of gravity of the load on the nest of springs coincides with the longitudinal center line of the side frame.

While the invention has been described with reference to specific structural features of the side frame and bolster, it will be understood that changes may be made in these elements and in the shock absorber mountings. Such modifications may be made without departing from the spirit and scope of the invention, as set forth in the appended claims.

What we claim and desire to secure by Letters Patent is:

1. In a four-wheel railway car truck for freight service, a side frame of the truss-type having a bolster opening including a compression member and a spring seat box-shaped in cross section, a bracket plate positioned outboard of the box-shaped spring seat, two generally triangular shaped ribs spaced longitudinally of the side frame projecting at right angles from the outboard wall of the box-shaped spring seat and formed integral therewith, said ribs at their upper ends integrally joining said bracket plate and defining the ends of the bracket plate, a bolster having a portion extending through the bolster opening in the side frame, a top wall and a bottom wall on the bolster, a centrally disposed vertical web joining the top and bottom walls of the bolster, a plurality of coil springs supporting the bolster on said spring seat with at least two of the springs at the outboard side of the frame spaced from each other longitudinally of the side frame, said bracket plate having an opening therein in alignment with a center line of the bolster and intermediate the axis of the spaced springs at the outboard side of the side frame, an elongated cylindrical shaped hydraulic shock absorber, a stem carried by the lower end of the shock absorber extending downwardly through the opening in said bracket plate, means including resilient washers securing said stem to the bracket plate, an extension integral with the top wall of the bolster, vertically disposed ribs integral with the ends of said extension and integral with the top and bottom walls of the bolster and spaced from opposite side of said web, said extension having a slot therein extending to the outboard end of the extension and positioned in a vertical plane defined by the axis of the opening in the bracket plate and in alignment with said web, a stem carried by the upper end of said hydraulic shock absorber extending through said slot, means including resilient washers for securing the stem at the upper end of the shock absorber to said extension, and a metal bushing between the resilient washers at the upper end of the shock absorber engaging the extension within said slot.

2. In a railway car truck, a side frame including a compression member and a spring seat box-shaped in cross section, said side frame having a bolster opening therein, a bracket plate positioned outboard of the box-shaped spring seat, two substantially triangular shaped ribs spaced longitudinally of the side frame extending outwardly from an outboard wall of the box-shaped spring seat formed integral therewith and integral with said bracket plate and defining the ends of the bracket plate, a bolster having a portion extending through the bolster opening in the side frame, a top and a bottom wall on the bolster, coil springs supporting the bolster on said spring seat with springs at the outboard side of the frame spaced from each other lengthwise of the side frame, said bracket plate having an opening therein substantially in alignment with the center line of the bolster and intermediate the axis of said spaced springs, an elongated hydraulic shock absorber, a stem carried by the lower end of the shock absorber extending downwardly through the opening in said bracket plate, means including resilient washers securing said stem to the bracket plate, an extension carried by the top wall of the bolster, vertically disposed spaced ribs integral with the ends of said extension joining the top and bottom walls of the bolster, said extension having a slot therein open at the outboard end of the extension and positioned in a vertical plane extending through the axis of the opening in the bracket plate, a stem carried by the upper end of said hydraulic shock absorber extending through said slot, and means including resilient washers securing the stem at the upper end of the shock absorber to said bolster extension.

3. In a railway car truck, a side frame including a compression member and a tension member box-shaped in cross section, said side frame having a bolster opening therein, a bracket plate extending outboard from the top wall of the box-shaped tension member, a triangular shaped rib integral with the bracket plate at each end thereof and depending therefrom and rigidly joined with an outboard wall of the box-shaped tension member, a bolster having an end portion extending through the bolster opening, said bolster having a top and bottom wall, a plurality of helical springs supporting the bolster on the tension member, said springs at the outboard side of the tension member being spaced from each other longitudinally of the side frame, said bracket plate having an opening therein between the spaced springs, an elongated cylindrical shaped hydraulic shock absorber, a stem carried by the lower end of the shock absorber extending through the opening in the bracket plate, a resilient washer at each side of the bracket plate embracing the stem, means for securing the stem to the bracket plate, an extension carried by the top wall of the bolster, said extension having a slot therein open at the outboard end of the extension, a stem carried by the upper end of the shock absorber extending through said slot, resilient washers embracing the stem at the upper end of the shock absorber and arranged on opposite side of said extension, means maintaining the stem at the upper end of the shock absorber in operative association with said extension, and a vertically disposed rib depending from each end of said extension and integral with the top and bottom walls of the bolster.

4. In a railway car truck of the four-wheel type, a side frame of the truss-type having a bolster opening therein including a tension member and a spring seat portion box-shaped in cross section, a bracket plate positioned outboard of the tension member and above the plane of the top web of the spring seat, substantially triangular shaped ribs integral with the ends of the bracket plate depending therefrom and rigidly secured to an outboard wall of the box-shaped portion of the spring seat, a bolster incuding a portion extending through the bolster opening, a plurality of helical springs supporting the bolster on the tension member, said bracket plate having an opening therein in alignment with the center line of the bolster, an elongated hydraulic shock absorber, a stem carried by the lower end of the shock absorber extending through the opening in the bracket plate, removable means including resilient members securing the stem to the bracket plate, a rigid extension carried by the bolster above the top thereof, said extension having a slot therein open at the outboard end thereof, a stem carried by the upper end of the shock absorber extending through said slot, removable means including resilient members securing the stem at the upper end of the shock absorber to said extension, and ribs integral with the ends of the extension depending therefrom and integral with the bolster.

5. In a railway car truck, a side frame including a spring seat having a portion box-shaped in cross section, said side frame having a bolster opening therein, a bracket plate positioned outboard of the spring seat and arranged in a plane at an angle to the horizontal, substantially triangular shaped ribs integral with the ends of the bracket plate depending therefrom and rigidly joining an outboard wall of the box-shaped portion, a bolster having an end portion extending through the bolster opening, helical springs supporting the bolster on the spring seat, said bracket plate having a hole therein with the axis inclined upwardly and outwardly with respect to the side frame, an elongated hydraulic shock absorber arranged with the axis of the right angles to said bracket plate, a stem carried by the lower end of the shock absorber extending through the opening in said bracket plate, removable means including resilient members securing said stem to the bracket plate, an extension carried by the end of the bolster terminating in an angular portion substantially parallel with said bracket plate, said end portion having a slot therein open at the outboard end of the extension and in a vertical plane defined by the axis of the opening in the bracket plate, a stem carried by the upper end of the shock absorber extending through said slot, removable means including resilient members securing the stem at the upper end of the shock absorber to said extension, and ribs rigidly secured to each end of said extension and rigidly united with the bolster.

6. A bolster for a railway car truck comprising, a top and bottom wall, side walls connecting the top and bottom walls, an extension integral with the top wall of the bolster projecting from an end thereof, said extension having a slot therein open at the outer end of the extension, a rib rigidly connected to each end of the extension and depending therefrom, said ribs being rigidly connected to the top and bottom walls of the bolster, and a centrally disposed reinforcing web connecting the top and bottom walls of the bolster and terminating at its outer end adjacent the inner ends of said ribs.

7. In a railway car truck, a truss-type side frame including a compression member and a tension member, guide columns spaced longitudinally of the side frame connecting the compression member with the tension member, a spring seat between said guide columns for transferring loads thereon to the side frame, said side frame having a bolster opening between the guide columns, a bolster having an end portion extending through said bolster opening, a plurality of coil springs engaging the spring seat at their lower ends and resiliently supporting the bolster, a bracket carried by an outboard side of the spring seat, an extension carried by the bolster end portion inclined upwardly in proceeding outboard relative to the side frame, a plate carried by a free end of said extension, an elongated shock absorber connected at its lower end to said bracket and at its upper end to said plate, and said elongated shock absorber being inclined to a vertical plane and sloping outwardly in proceeding upwardly from its lower end to damp oscillations of said coil springs and damp lateral movements of the bolster.

8. In a railway car truck, a truss-type side frame including a compression member and a tension member, guide columns spaced longitudinally of the side frame connecting the compression member with the tension member and defining sides of a bolster window, a spring seat between said guide columns at the bottom of the bolster window for transmitting loads thereon to central portions of the side frame, a bolster end portion extending through the bolster window, a plurality of coil springs resiliently supporting the bolster end portion on the spring seat, a bracket extending outboard from the spring seat having an upper face sloping downwardly in proceeding towards its outboard edge, a plate carried by an outboard end of said bolster end portion inclined with respect to the horizontal and substantially parallel to said bracket, an elongated shock absorber extending between the bracket and said plate, means connecting an upper end of the shock absorber to said plate midway between sides of the bolster end portion, means connecting a lower end of said elongated shock absorber to said bracket, and said elongated shock absorber being inclined outwardly in proceeding upwardly to snub oscillations of said coil springs and resist lateral movements of the bolster.

9. In a railway car truck, a truss-type side frame including a compression member and a tension member, guide columns spaced longitudinally of the side frame connecting the compression member with the tension member and defining sides of a bolster window in the side frame, a spring seat at a lower portion of said bolster window for transmitting loads thereon to the side frame, a bolster including an end portion extending into the bolster window, a plurality of coil springs resiliently supporting the bolster end portion on said spring seat, a bracket positioned outboard of the spring seat connected thereto and having an upper face sloping downwardly in proceeding towards its outboard edge, said bracket having an opening therethrough midway between the guide columns, an extension projecting outboard from said bolster end portion inclined upwardly in proceeding outwardly, a plate carried by said extension above a top of the bolster and inclined with respect to the horizontal and substantially parallel to the upper face of said bracket, said plate having an aperture therethrough midway between sides of the bolster end portion, an elongated snubbing device extending between said bracket and said plate with its axis at substantially at right angles to the plate and the upper face of the bracket, means extending into the aperture connecting an upper end of the elongated snubbing device to said plate, means extending into said opening connecting a lower end of the snubbing device to said bracket, and said elongated snubbing device being inclined outwardly of a vertical plane in proceeding upwardly to damp oscillations of said coil springs and resist lateral movements of the bolster.

JAMES C. SETTLES.
LOREE ELWYN FURNISS.

References Cited in the file of this patent

UNITED STATES PATENTS

| Number | Name | Date |
|---|---|---|
| 1,916,083 | Somervell | June 27, 1933 |
| 1,976,937 | Haseltine | Oct. 16, 1934 |
| 2,222,321 | Pflager | Nov. 19, 1940 |
| 2,226,713 | Folmsbee | Dec. 31, 1940 |
| 2,317,399 | Nystrom et al. | Apr. 27, 1943 |
| 2,319,623 | Nystrom et al. | May 18, 1943 |
| 2,327,955 | Baselt | Aug. 24, 1943 |
| 2,344,033 | Elsey | Mar. 14, 1944 |
| 2,370,106 | Edstrom | Feb. 20, 1945 |
| 2,386,895 | Haseltine | Oct. 16, 1945 |
| 2,403,352 | Edstrom | July 2, 1946 |